(12) United States Patent
Mitsui et al.

(10) Patent No.: US 10,138,990 B2
(45) Date of Patent: Nov. 27, 2018

(54) ROCK SHAFT AND STEERING SYSTEM

(71) Applicant: JTEKT CORPORATION, Osaka-shi, Osaka (JP)

(72) Inventors: Kuniaki Mitsui, Sorakugun (JP); Ryota Inagaki, Okazaki (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 15/067,534

(22) Filed: Mar. 11, 2016

(65) Prior Publication Data

US 2016/0273641 A1 Sep. 22, 2016

(30) Foreign Application Priority Data

Mar. 17, 2015 (JP) .................................. 2015-053322

(51) Int. Cl.
*F16H 55/26* (2006.01)
*B62D 3/12* (2006.01)

(52) U.S. Cl.
CPC ............. *F16H 55/26* (2013.01); *B62D 3/126* (2013.01)

(58) Field of Classification Search
CPC ................................ F16H 55/26; B62D 3/126
USPC ...................... 74/29, 30, 109, 409, 422, 457
See application file for complete search history.

(56) References Cited

U.S. PATENT DOCUMENTS

| | | | | |
|---|---|---|---|---|
| 9,321,478 | B2* | 4/2016 | Webber | ............... B62D 5/0424 |
| 9,694,843 | B2* | 7/2017 | Taoka | ...................... B62D 3/12 |
| 2015/0276037 | A1 | 10/2015 | Yamawaki et al. | |
| 2016/0001352 | A1* | 1/2016 | Hagiwara | ............... B62D 3/12 74/422 |
| 2016/0236706 | A1* | 8/2016 | Mitsui | ...................... B62D 3/12 |
| 2016/0273641 | A1* | 9/2016 | Mitsui | ................... B62D 3/126 |

FOREIGN PATENT DOCUMENTS

| | | |
|---|---|---|
| JP | 2013-006517 A | 1/2013 |
| JP | 2014-079769 A | 5/2014 |
| WO | 2014/061816 A1 | 4/2014 |
| WO | 2014/132770 A1 | 9/2014 |

OTHER PUBLICATIONS

Aug. 17, 2016 Extended Search Report issued in European Patent Application No. 16159815.6.

* cited by examiner

*Primary Examiner* — Victor L MacArthur
(74) *Attorney, Agent, or Firm* — Oliff PLC

(57) ABSTRACT

A rack shaft of the present invention includes: an effective rack tooth row formed by plastic deformation of a shaft member and having a plurality of rack teeth that mesh with a pinion; a ball screw portion having no rack tooth; an ineffective rack tooth that is formed between the effective rack tooth row and the ball screw portion and that does not mesh with the pinion; and a padding portion that extends from an end of the ball screw portion toward the ineffective rack tooth and that covers at least a part of the ineffective rack tooth.

12 Claims, 3 Drawing Sheets

ROCK SHAFT AND STEERING SYSTEM

INCORPORATION BY REFERENCE

The disclosure of Japanese Patent Application No. 2015-053322 filed on Mar. 17, 2014 including the specification, drawings and abstract, is incorporated herein by reference in its entirety.

BACKGROUND OF THE INVENTION

1. Field of the Invention

The present invention relates to rack shafts having a rack tooth row and steering systems including the same.

2. Description of the Related Art

For example, as described in Japanese Patent Application Publication No. 2013-6517 (JP 2013-6517 A), a rack shaft having a rack tooth row is applied to a steering system that steers wheels of a vehicle. For example, as described in Japanese Patent Application Publication No. 2014-79769 (JP 2014-79769 A), a rack shaft has a rack tooth formation portion, a non-rack tooth portion, and a connection portion. The rack tooth formation portion refers to a portion having a rack tooth row formed therein, and the non-rack tooth portion refers to a portion having no rack tooth row formed therein. The connection portion refers to a portion that connects the rack tooth formation portion and the non-rack tooth portion.

In the rack tooth formation portion of the rack shaft, an excess material of a shaft member escapes in the axial direction during plastic working such as forging. This tends to result in underfill in the rack tooth located at an end in the axial direction of the rack tooth row. Such a rack tooth is therefore less likely to have desired accuracy.

Such a rack tooth that does not have desired accuracy cannot be used to mesh with a pinion. Accordingly, in the connection portion of the rack shaft, what is called a sacrificed tooth, namely an ineffective rack tooth, is formed next to the effective rack tooth at the end in the axial direction of the rack tooth row. Moreover, a padding portion that connects the peripheral surface of the non-rack tooth portion and the bottom of the ineffective rack tooth is formed next to the ineffective rack tooth. As used herein, the "ineffective rack tooth" refers to the rack tooth that is not at all contacted by pinion teeth of the pinion that meshes with the rack tooth row, and the "effective rack tooth" refers to the rack tooth that is at least partially contacted by the pinion teeth. The padding portion also improves release properties of a punch from a die in a mold for use in forging.

In the conventional rack shafts, the rack tooth formation portion and the non-rack tooth portion are connected by the connection portion having the ineffective rack tooth and the padding portion formed therein. Accordingly, there is a limit in reducing the axial length of the rack shaft.

SUMMARY OF THE INVENTION

It is one object of the present invention to provide a rack shaft whose axial length can be reduced and a power steering system including the same.

According to one aspect of the present invention, a rack shaft includes: an effective rack tooth row formed by plastic deformation of a shaft member and having a plurality of rack teeth that mesh with a pinion; a non-rack tooth portion having no rack tooth; an ineffective rack tooth that is formed between the effective rack tooth row and the non-rack tooth portion and that does not mesh with the pinion; and a padding portion that extends from an end of the non-rack tooth portion toward the ineffective rack tooth and that covers at least a part of the ineffective rack tooth.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
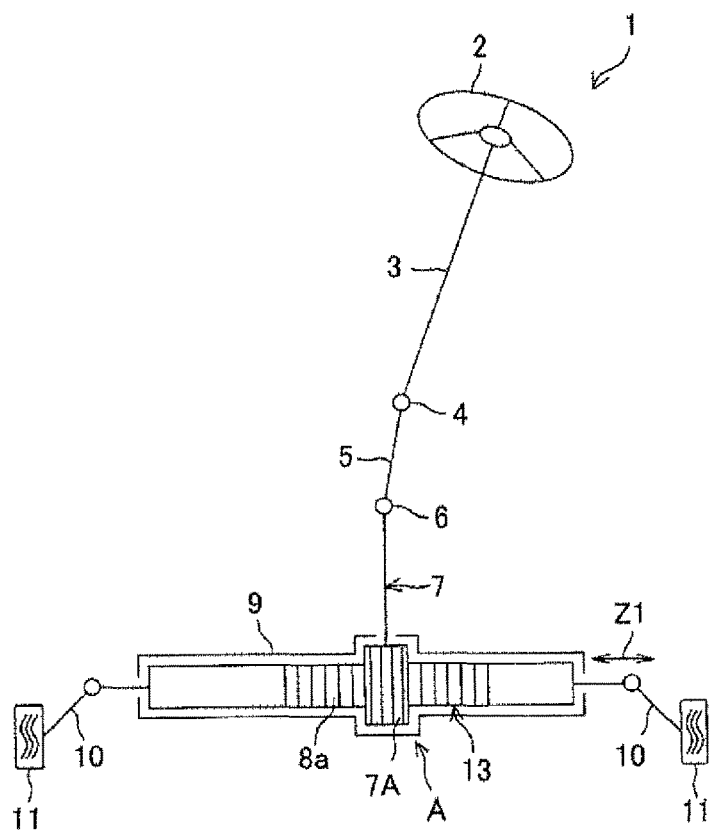
FIG. 1 is a schematic view showing the general configuration of a rack-pinion steering system according to an embodiment of the present invention.

A steering system of an embodiment of the present invention will be described with reference to FIG. 1. A steering system 1 has a steering shaft 3, an intermediate shaft 5, a pinion shaft 7, and a rack shaft 13. The steering shaft 3 is coupled to a steering member 2 such as a steering wheel. The intermediate shaft 5 is coupled to the steering shaft 3 via a universal joint 4. The pinion shaft 7 is coupled to the intermediate shaft 5 via a universal joint 6. The rack shaft 13 is a steered shaft extending in the lateral direction of an automobile and having a rack 8a that meshes with a pinion 7A provided near an end of the pinion shaft 7. The pinion shaft 7 and the rack shaft 13 form a rack and pinion mechanism A as a steering mechanism.

A rack housing 9 is fixed to a vehicle body, and the rack shaft 13 is supported in the rack housing 9 via a plurality of bearings, not shown, so as to reciprocate linearly in an axial direction Z1. Both ends of the rack shaft 13 protrude to the outside of the rack housing 9 from both sides of the rack housing 9. Tie rods 10 are coupled to the ends of the rack shaft 13. Each of the tie rods 10 is coupled to a corresponding one of steered wheels 11 via a corresponding one of knuckle arms (not shown). When the steering member 2 is operated to rotate the steering shaft 3, the rotation of the steering shaft 3 is converted to a linear motion of the rack shaft 13 in the axial direction Z1 by the pinion 7A and the rack 8a. Steering of the steered wheels 11 is achieved in this manner.

Figure 2B:
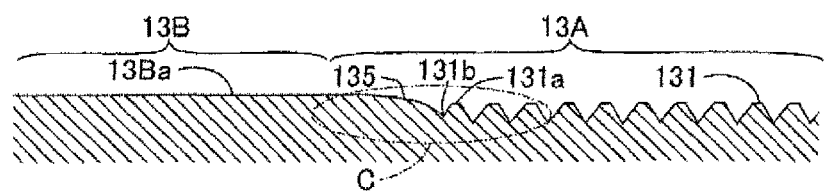
FIG. 2B is a sectional view taken along line A-A in FIG. 2A, showing the structure around a padding portion and an ineffective rack tooth in section along the axis.
Figure 2A:
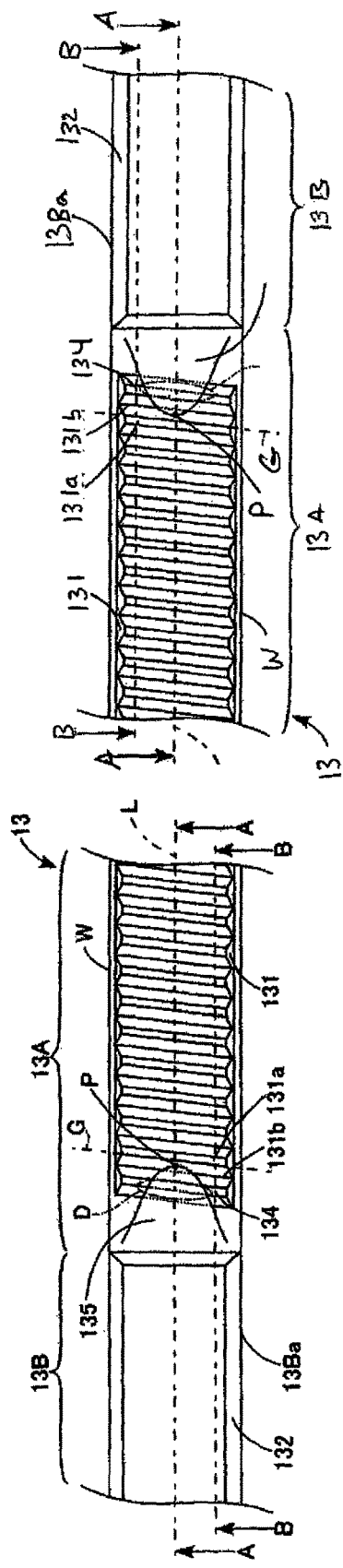
FIG. 2A is a view showing a rack tooth formation portion and a ball screw portion of a rack shaft as viewed in a direction perpendicular to an axis of the rack shaft and a tooth trace of an effective rack tooth row.

As shown in FIG. 2A, the rack shaft 13 has a rack tooth formation portion 13A and a ball screw portion 13B etc. An effective rack tooth row 131 is formed in the rack tooth formation portion 13A. An ineffective rack tooth 134 and a padding portion 135 are also formed at both ends in the axial direction of the effective rack tooth row 131 in the rack tooth formation portion 13A.

Figure 2C:
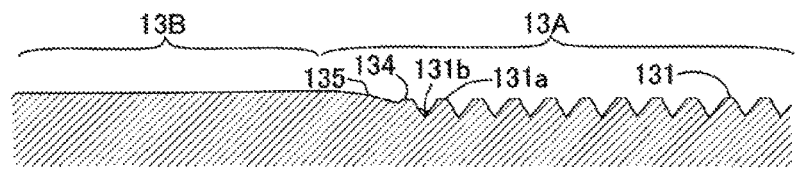
FIG. 2C is a sectional view taken along line B-B in FIG. 2A, showing the structure around the padding portion and the ineffective rack tooth in section along a straight line parallel to the axis.

As shown in FIGS. 2A to 2C, the rack tooth formation portion 13A has the effective rack tooth row 131, the ineffective rack tooth 134. The effective rack tooth row 131 is formed by plastically deforming the outer peripheral surface of one end of a shaft member W into a concave shape by warm closed die forging without flash. The ineffective rack tooth 134 is located at an end in an axis L direction of the region formed in the concave shape. The ineffective rack tooth 134 is formed in the range in which the padding portion 135 is formed in the axis L direction so that the ineffective rack tooth 134 adjoins the effective rack tooth row 131. The padding portion 135 is formed by plastic deformation when the effective rack tooth row 131 is formed by plastic deformation. The ball screw portion 13B has external threads 132 formed by cutting the outer peripheral surface of the other end of the shaft member W.

The rack tooth formation portion 13A is formed by heating the solid shaft member W made of a steel stock to 750° C. to 790° C. and pressing the heated solid shaft member W with a mold. In the case of using the solid shaft member W, the shaft member W has a large amount of material that escapes during plastic deformation. This restrains elongation of the shaft member W, whereby an effective rack tooth 131a located at an end of the effective rack tooth row 131 in the rack tooth formation portion 13A can be formed accurately. The solid shaft member W is more rigid than a hollow shaft member against bending caused by the impact that occurs when the vehicle goes over a bump etc. The solid shaft member W can reduce an increase in material cost, processing cost, etc. as compared to a hollow shaft member.

Figure 3A:
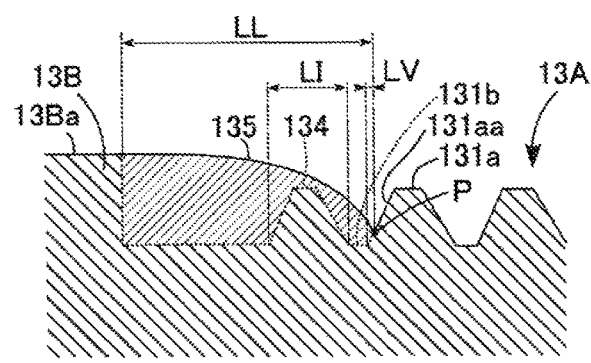
FIG. 3A is an enlarged view of a region C surrounded by a circle of an alternate long and short dash line in FIG. 2B, showing the ranges in which the padding portion overlaps an ineffective rack tooth and an effective rack tooth.

The ineffective rack tooth 134 is formed in the range in which the padding portion 135 is formed in the axis L direction of the rack shaft 13. That is, as shown in FIG. 2A, the ineffective rack tooth 134 is formed so that the middle part of the ineffective rack tooth 134 (a region D surrounded by a circle of an alternate long and short dash line in FIG. 2A) is covered by the padding portion 135 as viewed in a direction perpendicular to the axis L of the shaft member W and a tooth trace G of the effective rack tooth row 131. As shown in FIG. 3A, the middle part of the ineffective rack tooth 134 is formed so as to overlap the padding portion 135 in a range LI as viewed in the direction of the tooth trace G of the effective rack tooth row 131.

The axial length of the rack shaft 13 can therefore be reduced by an amount corresponding to the ineffective rack tooth, as compared to the conventional rack shafts. As described later in detail, the padding portion 135 is formed so as to be tilted from the ball screw portion 13B toward the effective rack tooth row 131. The axial length of the rack shaft 13 is thus adjustable by changing the tilt angle of the padding portion 135.

As is also described in "Description of the Related Art," the reason why the ineffective rack tooth 134 is formed is to prevent underfill of the effective rack tooth 131a of the effective rack tooth row 131 which is located at the end in the axis L direction. A part of an excess material from the portion that is supposed to be formed in the concave shape by closed die forging without flash may escape in the axis L direction of the shaft member W, and this may affect accuracy of the effective rack tooth row 131. Accordingly, the region where the ineffective rack tooth 134 is formed is used as a region to which the excess material escapes, thereby ensuring accuracy of the effective rack tooth row 131.

The padding portion 135 is formed between the ball screw portion 13B and the effective rack tooth row 131. That is, as shown in FIG. 2A, the padding portion 135 has a tapered shape from the ball screw portion 13B toward the rack tooth formation portion 13A as viewed in the direction perpendicular to the axis L of the shaft member W and the tooth trace G of the effective rack tooth row 131. The padding portion 135 has a symmetrical shape with respect to a straight line passing through the midpoint of the tooth trace G of the effective rack tooth row 131 and parallel to the axis L of the shaft member W (hereinafter this shape is referred to as the planar shape). As shown in FIGS. 2B and 2C, the padding portion 135 has a tilted shape that gently connects a peripheral surface 13Ba of the ball screw portion 13B and a side face 131aa (see FIG. 3A) of the effective rack tooth 131a as viewed in a direction perpendicular to the planar shape and the axis L of the shaft member W (hereinafter referred to as the lateral shape).

More specifically, as shown in FIG. 2A, the planar shape of the padding portion 135 is substantially an isosceles triangle. As shown in FIGS. 2B and 2C, the lateral shape of the padding portion 135 is substantially a right triangle. In other words, the three-dimensional shape of the padding portion 135 is substantially a cone cut in half in the axial direction (substantially semi-conical shape). That is, the padding portion 135 has a substantially semi-conical three-dimensional shape with its semi-circular bottom face located in the ball screw portion 13B and its vertex P located in the rack tooth formation portion 13A. This makes it easy for the operator to know the flow of the material of the shaft member W in warm closed die forging without flash. Accordingly, a forging mold capable of accurately forming the effective rack tooth row 131 can be designed.

The padding portion 135 is formed to extend to a position between the ineffective rack tooth 134 and the effective rack tooth 131a adjoining the ineffective rack tooth 134. Specifically, as shown in FIG. 3A, the padding portion 135 is formed so that the vertex P is located on the side face 131aa of the effective rack tooth 131a. That is, the range LL in which the padding portion 135 is formed extends from the boundary between the ball screw portion 13B and the rack tooth formation portion 13A to an intermediate position on the side face 131aa of the effective rack tooth 131a.

The padding portion 135 is formed in the tilted shape that gently connects the peripheral surface 13Ba of the ball screw portion 13B and the side face 131aa of the effective rack tooth 131a. One reason why the padding portion 135 is formed in the tilted shape is to stop the flow of the excess material of the shaft member W which escapes in the axial direction during closed die forging without flash and to prevent underfill of the effective rack tooth 131a by effectively using the press pressure. Another reason is to improve release properties of a punch from a die in a mold for use in closed die forging without flash.

The reason why the padding portion 135 is formed so that the vertex P is located on the side face 131aa of the effective rack tooth 131a is as follows. Typically, the steering system 1 is subjected to a large load when the end of the effective rack tooth 131a meshes with the pinion shaft 7, namely when the gear tooth of the pinion shaft 7 meshes with the effective rack tooth 131a located at the axial end of the effective rack tooth row 131 (the state shown in FIG. 2A). The effective rack tooth 131a may be damaged at that time.

However, as shown in FIG. 3A, the range LL in which the padding portion 135 is formed includes an overlapping range LI with the entire ineffective rack tooth 134 and an overlapping range LV with a part of the side face 131aa of the effective rack tooth 131a. A bottom 131b located between the ineffective rack tooth 134 and the effective rack tooth 131a is thus covered by the padding portion 135. In this manner, the bottom 131b as the root of the effective rack tooth 131a can be covered by the padding portion 135. This can reduce tooth root stress and ensure strength of the effective rack tooth 131a at the time the end of the effective rack tooth 131a meshes with the pinion shaft 7. Damage to the effective rack tooth 131a can thus be reduced.

The rack shaft 13 of the present embodiment is formed by plastic deformation of the shaft member W. The rack shaft 13 includes the effective rack tooth row 131, the ball screw portion 13B, the ineffective rack tooth 134, and the padding portion 135. The effective rack tooth row 131 has a plurality of rack teeth that mesh with the pinion 7A. The ball screw portion 13B has no rack tooth. The ineffective rack tooth 134 is formed between the effective rack tooth row 131 and the ball screw portion 13B and does not mesh with the pinion 7A. The padding portion 135 extends from the end of the ball screw portion 13B toward the ineffective rack tooth 134 and covers at least a part of the ineffective rack tooth 134.

In the rack shaft 13, at least a part of the ineffective rack tooth 134 is thus formed in the range in which the padding portion 135 is formed in the axial direction of the shaft member W. Accordingly, the axial length of the rack shaft 13 can be reduced by an amount corresponding to the ineffective rack tooth 134 covered by the padding portion 135, as compared to conventional rack shafts. The steering system 1 to which the rack shaft 13 is applied can thus be reduced in size.

The padding portion 135 is desirably formed to extend to a position between the ineffective rack tooth 134 and the effective rack tooth 131a of the effective rack tooth row 131 which adjoins the ineffective rack tooth 134. In particular, the padding portion 135 is desirably formed to extend to the side face 131aa of the effective rack tooth 131a adjoining the ineffective rack tooth 134. The padding portion 135 thus covers the bottom 131b between the ineffective rack tooth 134 and the effective rack tooth 131a. This can improve the strength of the effective rack tooth 131a, i.e., the effective rack tooth 131a located at the end in the axial direction.

The padding portion 135 is desirably provided on both sides in the axial direction of the effective rack tooth row 131. This can further reduce the axial length of the rack shaft 13. The shaft member W is desirably a solid member. The solid shaft member W has a large amount of excess material that escapes during plastic deformation. This restrains elongation of the shaft member W, whereby the effective rack tooth 131a located at the end of the effective rack tooth row 131 in the rack tooth formation portion 13A can be formed accurately.

The padding portion 135 desirably has a tapered shape from the ball screw portion 13B toward the effective rack tooth row 131 as viewed in the direction perpendicular to the axis L of the shaft member W and the tooth trace G of the effective rack tooth row 131. The padding portion 135 desirably has a symmetrical shape with respect to a straight line passing through the midpoint of the tooth trace G of the effective rack tooth row 131 and parallel to the axis L of the shaft member W. This makes it easy for the operator to know the flow of the material of the shaft member W in warm closed die forging without flash. Accordingly, a forging mold capable of accurately forming the effective rack tooth row 131 can be designed.

The ineffective rack tooth 134 is desirably formed on both sides of the straight line passing through the midpoint of the tooth trace G of the effective rack tooth row 131 and parallel to the axis L of the shaft member W as viewed in the direction perpendicular to the axis L of the shaft member W and the tooth trace G of the effective rack tooth row 131. In this case, the regions where the ineffective rack tooth 134 is formed serve as regions to which the excess material escapes. Accuracy of the effective rack tooth row 131 can thus be ensured.

Figure 3B:
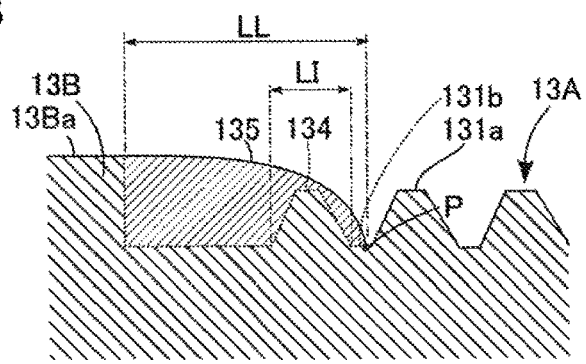
FIG. 3B is an enlarged view of another example of the region C surrounded by the circle of the alternate long and short dash line in FIG. 2B, showing the range in which the padding portion overlaps the ineffective rack tooth.
Figure 3C:
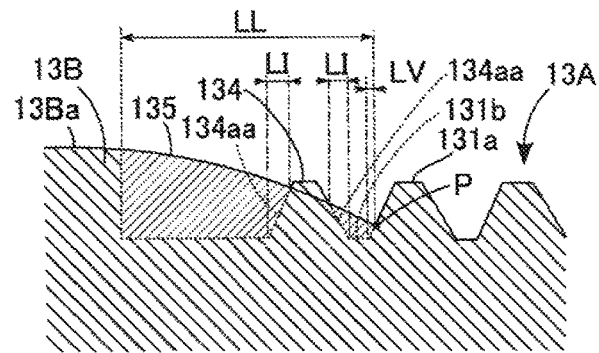
FIG. 3C is an enlarged view of still another example of the region C surrounded by the circle of the alternate long and short dash line in FIG. 2B, showing the range in which the padding portion overlaps the ineffective rack tooth and the effective rack tooth.

According to the above embodiment, as shown in FIG. 3A, the padding portion 135 is formed so that the vertex P is located on the side face 131aa of the effective rack tooth 131a. As shown in FIG. 3B, however, the padding portion 135 may be formed so that the vertex P is located on the bottom 131b between the ineffective rack tooth 134 and the effective rack tooth 131a. In this configuration as well, the padding portion 135 covers a part of the bottom 131b between the ineffective rack tooth 134 and the effective rack tooth 131a. The strength of the effective rack tooth 131a can thus be increased to some extent. The different cross-hatching patterns in FIGS. 3A-3C are merely provided to illustrate the padding portion 135 relative to the ineffective rack tooth 134, and are not meant to imply that the padding portion 135 and the ineffective rack tooth 134 are separate elements.

In the above embodiment, as shown in FIG. 3A, the range LL in which the padding portion 135 is formed includes the overlapping range LI with the entire ineffective rack tooth 134. As shown in FIG. 3C, however, the range LL in which the padding portion 135 is formed may include the overlapping ranges LI with a part of both side faces 134aa of the ineffective rack tooth 134. In this case as well, the padding portion 135 may be formed so that the vertex P is located on the bottom 131b between the ineffective rack tooth 134 and the effective rack tooth 131a, as shown in FIG. 3B.

For the padding portion 135 of the rack shaft 13 of the above embodiment, there need be at least one ineffective rack tooth 134 that adjoins the effective rack tooth row 131. Alternatively, there may be two or more ineffective rack teeth 134 that adjoin the effective rack tooth row 131. In the rack shaft 13 of the above embodiment, the ball screw portion 13B is described as an example of the non-rack tooth portion. However, similar effects can be obtained even if the rack shaft 13 is, e.g., merely a tubular shank. The rack shaft 13 of the above embodiment is described with respect to the case where the rack shaft 13 is formed by closed die forging (closed die forging without flash) that does not cause the excess material of the shaft member W as a material to form flash. However, the rack shaft 13 may be formed by closed die forging etc. that causes the excess material of the shaft member W to form flash. The rack shaft 13 of the above embodiment is similarly applicable to an electric power steering system and a hydraulic power steering system.

According to the present invention, at least a part of the ineffective rack tooth is formed in the range in which the padding portion is formed in the axial direction of the shaft member. The axial length of the rack shaft can therefore be reduced by an amount corresponding to the ineffective rack tooth covered by the padding portion, as compared to the conventional rack shafts. The steering system to which the rack shaft is applied can thus be reduced in size.

What is claimed is:

1. A rack shaft, comprising:
a rack tooth portion including a plurality of rack teeth, the rack tooth portion being formed by plastic deformation of a shaft member;
a non-rack tooth portion having no rack tooth and being at an end of the rack tooth portion, wherein a closest one of the plurality of rack teeth to the non-rack tooth portion is an ineffective rack tooth that is configured to not mesh with a pinion, and remaining ones of the plurality of rack teeth form an effective rack tooth row that is configured to mesh with a pinion; and
a padding portion that extends in an axial direction of the rack shaft from an end of the non-rack tooth portion toward the ineffective rack tooth and that extends beyond the ineffective rack tooth in the axial direction, wherein
the ineffective rack tooth includes portions extending from opposite sides of the padding portion in opposite directions that are transverse to the axial direction, and
the padding portion is formed to extend to a side face of a first effective rack tooth, the first effective rack tooth being a first one of the effective rack tooth row that is adjacent to the ineffective rack tooth.

2. The rack shaft according to claim 1, wherein the padding portion is provided on both sides in an axial direction of the effective rack tooth row.

3. The rack shaft according to claim 1, wherein the shaft member is a solid member.

4. The rack shaft according to claim 1, wherein the padding portion has a tapered shape from the non-rack tooth portion toward the effective rack tooth row as viewed in a direction perpendicular to an axis of the shaft member and a tooth trace of the effective rack tooth row, and the padding portion has a symmetrical shape with respect to a straight line passing through a midpoint of the tooth trace of the effective rack tooth row and parallel to the axis of the shaft member,
wherein the tooth trace is defined by an intersection of a side face and a top surface of one of the plurality of rack teeth that form the effective rack tooth row.

5. The rack shaft according to claim 4, wherein the ineffective rack tooth is formed on both sides of the straight line passing through the midpoint of the tooth trace of the effective rack tooth row and parallel to the axis of the shaft member as viewed in the direction perpendicular to the axis of the shaft member and the tooth trace of the effective rack tooth row.

6. A steering system, comprising:
a housing;
the rack shaft according to claim 1, which is supported by the housing so as to be movable in the axial direction, and is coupled to a wheel of a vehicle; and
a pinion shaft that is supported by the housing so as to be rotatable about an axis thereof, that meshes with the effective rack tooth row of the rack shaft, and is coupled to a steering system of the vehicle.

7. The rack shaft according to claim 1, wherein the padding portion has a furthest point in the axial direction at a side face of the first effective rack tooth of the effective rack tooth row that is adjacent to the ineffective rack tooth.

8. The rack shaft according to claim 7, wherein the ineffective rack tooth has opposite side faces extending to a peak height in a direction perpendicular to the axial direction, and
the padding portion intersects a portion of the ineffective tooth in the axial direction at a height that is lower than the peak height in the direction perpendicular to the axial direction.

9. The rack shaft according to claim 7, wherein the ineffective rack tooth has opposite side faces extending to a peak height in a direction perpendicular to the axial direction, and
the padding portion intersects a portion of the ineffective tooth in the axial direction at a height that is higher than the peak height in the direction perpendicular to the axial direction.

10. The rack shaft according to claim 1, wherein the padding portion has a furthest point in the axial direction at a bottom surface of the rack tooth portion between a side face of the ineffective rack tooth and a side face of a first effective rack tooth of the effective rack tooth row that is adjacent to the ineffective rack tooth.

11. The rack shaft according to claim 1, wherein each of the plurality of rack teeth has opposite side faces extending from a bottom of the rack tooth portion to a peak, one of the opposite side faces intersecting with the peak to define a tooth trace of the effective rack tooth row that extends in a direction transverse to the axial direction, and
the padding portion has a tapered shape from the non-rack tooth portion toward the effective rack tooth row as viewed in a direction perpendicular to the axial direction of the shaft member and perpendicular to the tooth trace of the effective rack tooth row.

12. The rack shaft according to claim 11, wherein the padding portion has a symmetrical shape with respect to a straight line extending in the axial direction of the shaft member and passing through a midpoint of the tooth trace of the effective rack tooth row.

* * * * *